United States Patent
Huang et al.

(10) Patent No.: US 8,293,549 B2
(45) Date of Patent: Oct. 23, 2012

(54) METHOD OF FABRICATING A PIXEL ARRAY SUBSTRATE

(75) Inventors: Kai-Hung Huang, Taipei County (TW); Li-Wen Wang, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 0 days.

(21) Appl. No.: 12/958,401

(22) Filed: Dec. 2, 2010

(65) Prior Publication Data

US 2012/0034719 A1 Feb. 9, 2012

(30) Foreign Application Priority Data

Aug. 3, 2010 (TW) .............................. 99125805 A

(51) Int. Cl.
*H01L 21/00* (2006.01)
(52) U.S. Cl. .................................. 438/29; 257/E21.536
(58) Field of Classification Search .................. 438/29; 257/E21.536
See application file for complete search history.

(56) References Cited

U.S. PATENT DOCUMENTS

| 6,600,534 | B1 | 7/2003 | Tanaka |
| 7,656,479 | B2 * | 2/2010 | Lin et al. .................... 349/113 |
| 7,919,340 | B2 * | 4/2011 | Ikeda et al. .................... 438/29 |
| 2003/0053016 | A1 * | 3/2003 | Kubota et al. ................ 349/113 |

OTHER PUBLICATIONS

Kai-Hung Huang et al., Title: Pixel Array Substrate, pending U.S. Appl. No. 12/958,408, filed Dec. 2, 2010.

* cited by examiner

*Primary Examiner* — William D Coleman
(74) *Attorney, Agent, or Firm* — Winston Hsu; Scott Margo

(57) ABSTRACT

A method of fabricating a pixel array substrate is disclosed. The reflective pixel array substrate can be made by utilizing five photo masks only. The reflective pixel array substrate includes a substrate, a thin film transistor, a reflective electrode, an insulating layer and numerous protruding bumps. The step between the protrusion bump and the substrate cause the reflective electrode thereon to have a corrugated structure. The gate electrode of the thin film transistor and the protruding bumps are made of a same conductive layer. The drain electrode connects the reflective electrode, and the drain electrode and the reflective electrode are made of a same conductive layer.

10 Claims, 8 Drawing Sheets

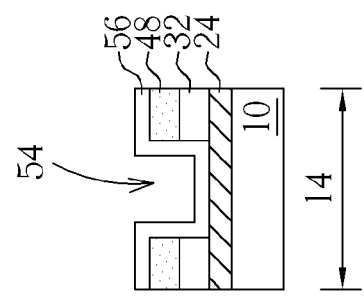
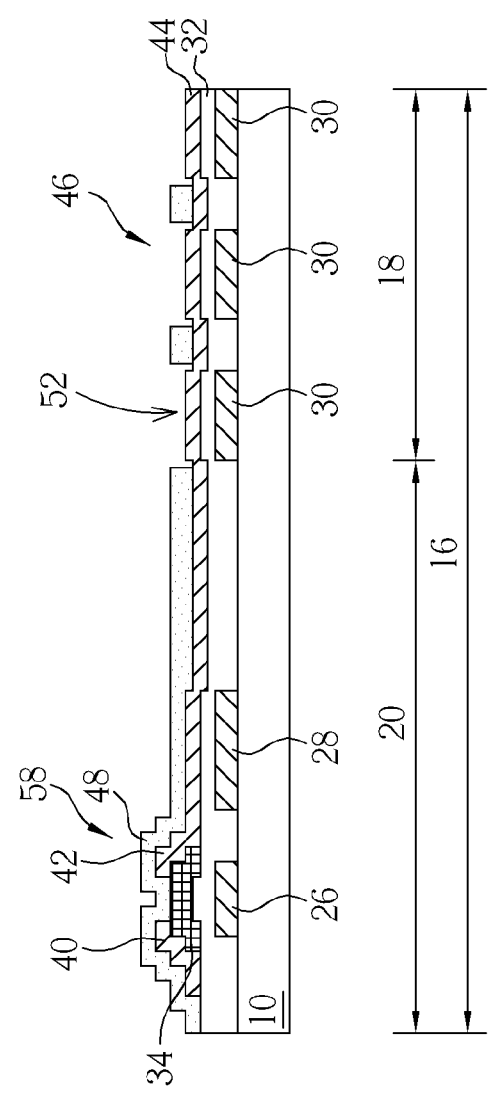
FIG. 4C
FIG. 4B

METHOD OF FABRICATING A PIXEL ARRAY SUBSTRATE

BACKGROUND OF THE INVENTION

1. Field of the Invention

The present invention relates to a method of making a pixel array substrate, and more particularly to a method of making a reflective pixel array substrate.

2. Description of the Prior Art

Reflection liquid crystal display devices are commonly used for portable cellular phones or intelligent terminals. In a reflection liquid crystal display, an externally entered incident light is reflected by a reflector disposed within the back light module and the reflected light is used as a display illumination light. As a result, reflection type liquid crystal display devices are more effective at achieving reduction in power consumption, thickness and weight compared with a transmitting type liquid crystal display device.

A reflection liquid crystal display device should have a display performance for displaying a bright and white display when the liquid crystal is in the light transmitting state. In order to realize this display performance, it is necessary to effectively reflect back the incident light from various directions. To achieve this, the reflection electrode on the reflective pixel array substrate is formed with a convex/concave structure.

To form a reflective pixel array substrate in the reflection liquid crystal display device requires too many fabricating steps, however. A simplified production procedure is required in order to reduce the production cost and production time.

SUMMARY OF THE INVENTION

It is therefore an objective of the present invention to provide a method of fabricating a reflective pixel array substrate to solve the above mentioned problems.

A method of fabricating a reflective pixel array substrate is provided according to an exemplary embodiment of the present invention. The method includes the following steps. First, a substrate having at least a pixel region is provided. The pixel region has a reflective region and an element region. Next, a first conductive layer is formed on the substrate. The first conductive layer is patterned to form a gate line, a gate electrode and a common line within the element region, and to form a plurality of protruding bumps within the reflective region. Subsequently, a first insulating layer is formed to cover the substrate, the gate line, the gate electrode, the common line and the protruding bumps. Then, a semiconductive layer is formed on the gate electrode. After that, a second conductive layer is formed on the first insulating layer and the semiconductive layer. Next, the second conductive layer is patterned to form a source line, a source electrode, and a drain electrode within the element region and to form a reflective electrode extending from the element region to the reflective region, wherein the reflective electrode overlaps with the protruding bumps. Then, a second insulating layer is formed to cover the element region and the reflective region. Finally, the second insulating layer within the reflective region is patterned to form a plurality of first openings, wherein the reflective electrode disposed directly above each of the plurality of the protruding bumps is exposed through the first openings.

The reflective pixel array substrate of the present invention is compatible with current processes. Furthermore, only five photo masks are needed to form the reflective pixel array substrate. Therefore, the method provided in the present invention can simplify the fabricating process, increase the product output and reduce the production cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
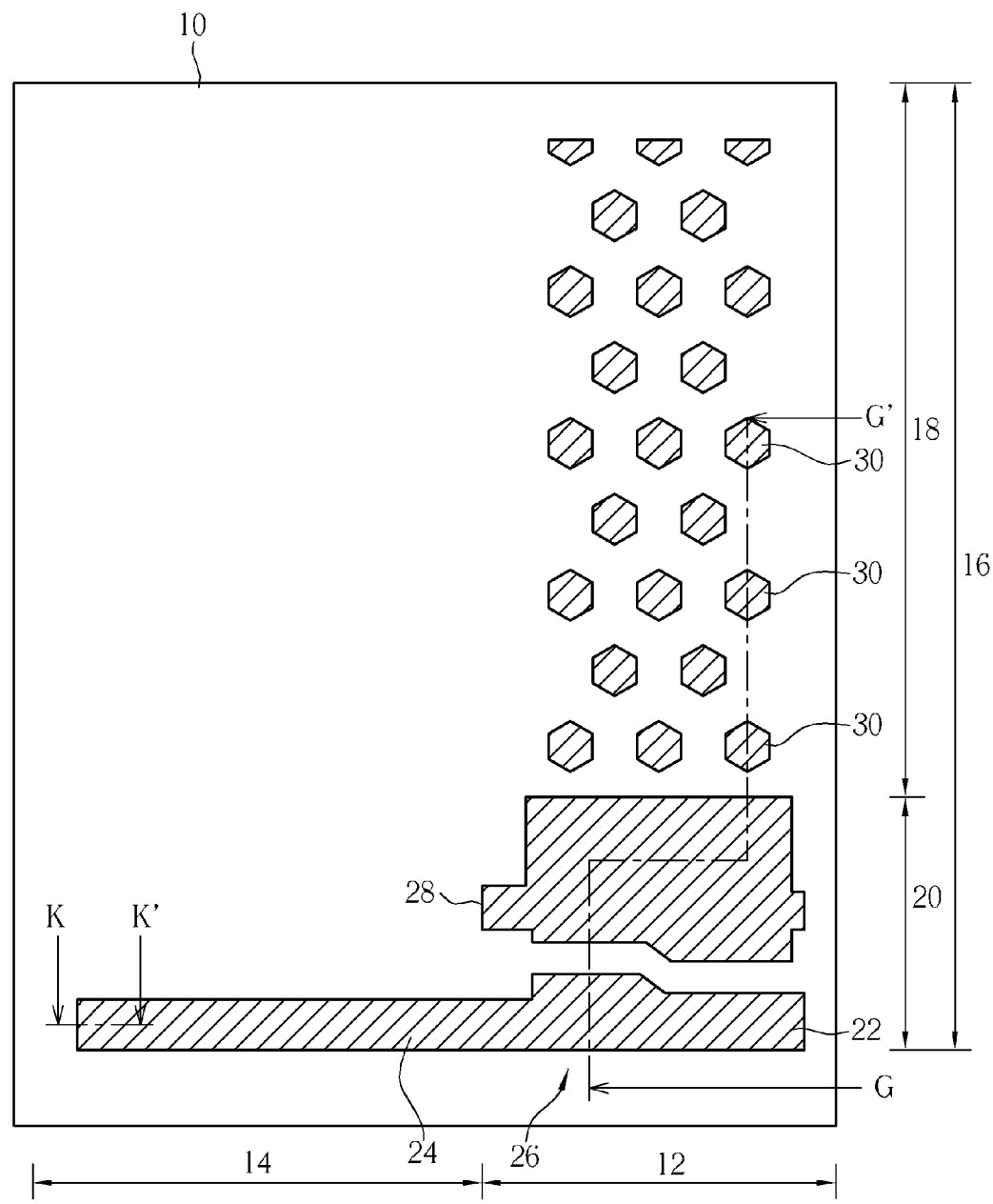
FIG. 1A to FIG. 4C show a method of fabricating a reflective pixel array substrate according to a preferred embodiment of the present invention.

FIG. 1A to 4C show a method of fabricating a reflective pixel array substrate according to a first preferred embodiment of the present invention. FIG. 1A shows a top view of a first preferred embodiment of the present invention. FIG. 1B is a sectional view of FIG. 1A taken along the line G-G'. FIG. 1C is a sectional view of FIG. 1A taken along the line K-K'.

Figure 1C:
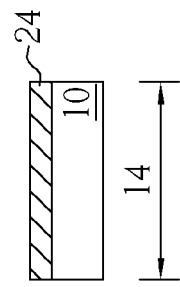
Figure 1B:
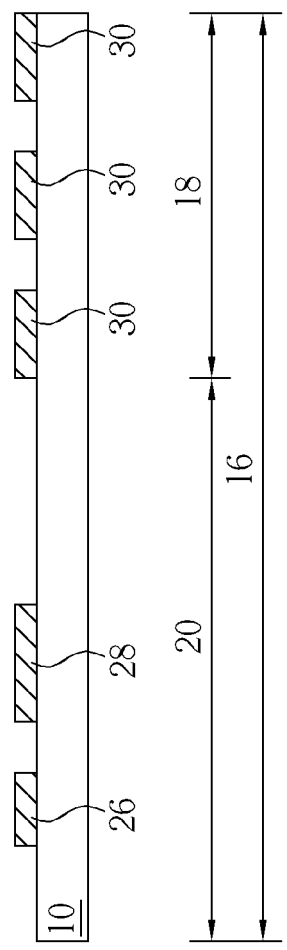

As shown in FIGS. 1A, 1B and 1C, first a substrate 10 having an active region 12 and at least one peripheral circuit region 14 is provided. The peripheral circuit region 14 is disposed at an edge of the active region 12. At least one pixel region 16 is disposed in the active region 12. The pixel region 16 can be divided into a reflective region 18 and an element region 20. For the sake of brevity, only one pixel region 16 is described in the detailed description. Please note, however, that there could be numerous pixel regions in the active region 12, and each of the pixel regions can be divided into an element region and a reflective region. The substrate 10 can be glass, plastic, quartz or other suitable materials.

Next, a conductive layer 22 is formed on the substrate 10. Then, a first photo mask (not shown) is utilized to perform a lithography and development process and the conductive layer 22 is patterned to form a gate line 24, a gate electrode 26, a common line 28, and protruding bumps 30 on the substrate 10. The gate electrode 26 and the common line 28 are disposed within the element region 20 of the pixel region 16. The protruding bumps 30 are disposed within the reflective region 18 of the pixel region 16. Additionally, the gate line 24 extends from the element region 20 to the peripheral circuit region 14.

The conductive layer 22 may be a metal layer made of Al, Cr, Mo, W, Ta, Cu or an alloy of the combination thereof. The conductive layer 22 may be a non metal layer such as indium tin oxide (ITO) or zinc oxide (ZnO). Furthermore, each of the protruding bumps 30 is individual and separate from each other. Each of the protruding bumps 30 is floating. Moreover, the shape of each of the protruding bumps 30 may be polygonal, circular or oval-shaped, but is not limited to these shapes. It is noteworthy that the gate line 24, the gate electrode 26, the common line 28 and the protruding bumps 30 are formed by utilizing one photo mask.

Figure 2A:
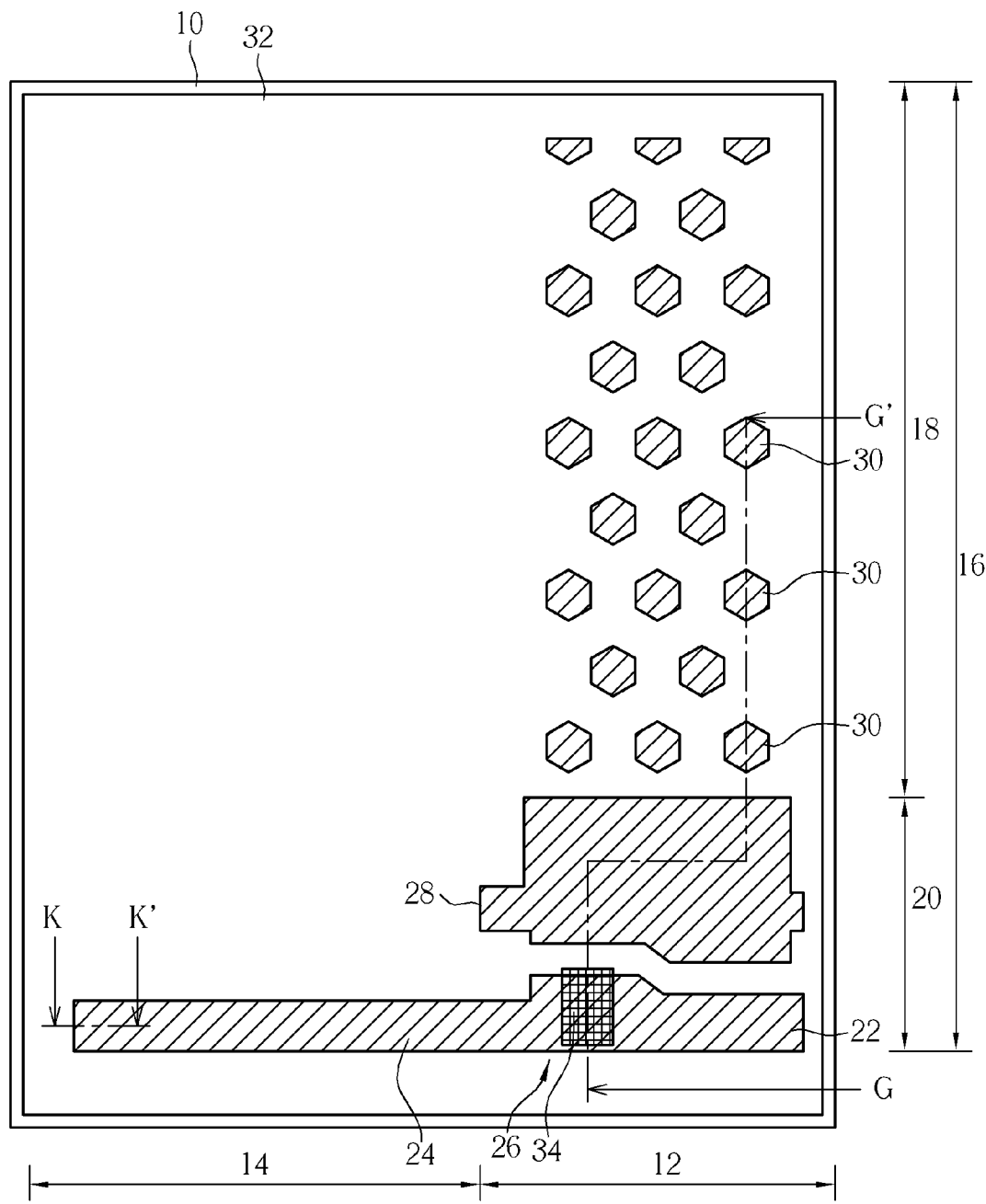
Figure 2C:
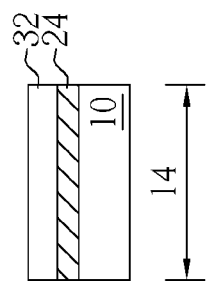
Figure 2B:
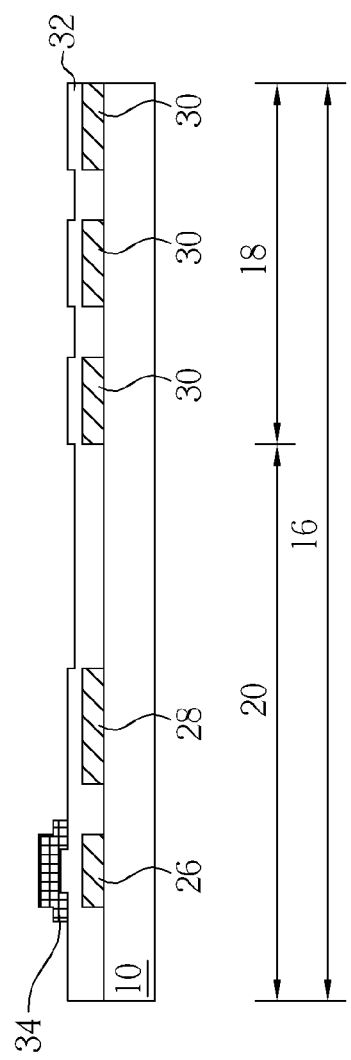

Please refer to FIGS. 2A, 2B and 2C. FIG. 2A shows a top view of a first preferred embodiment of the present invention. FIG. 2B is a sectional view of FIG. 2A taken along the line G-G'. FIG. 2C is a sectional view of FIG. 2A taken along the line K-K'. As shown in FIGS. 2A, 2B, and 2C, a gate insulating layer 32 is formed to cover the element region 20, the reflective region 18, and the peripheral circuit region 14 entirely. The gate insulating layer 32 conformally covers the substrate 10, the gate line 24, the gate electrode 26, the common line 28 and each of the protruding bumps 30. Because the gate insulating layer 32 covers each protruding bump 30 conformally, the surface of the gate insulating layer 32 will go up and down with the protruding bumps 30. The gate insulating layer 32 may be silicon oxide, silicon nitride, or silicon oxynitride, but is not limited to these materials. Then, a semiconductive layer 34 is formed on the gate insulating layer 32. After that, a second photo mask (not shown) is utilized during a lithographic and development process, and is followed by an etching process to pattern the semiconductive layer 34. After these processes, the patterned semiconductive layer 34 is positioned corresponds to the gate electrode 26.

Figure 3A:
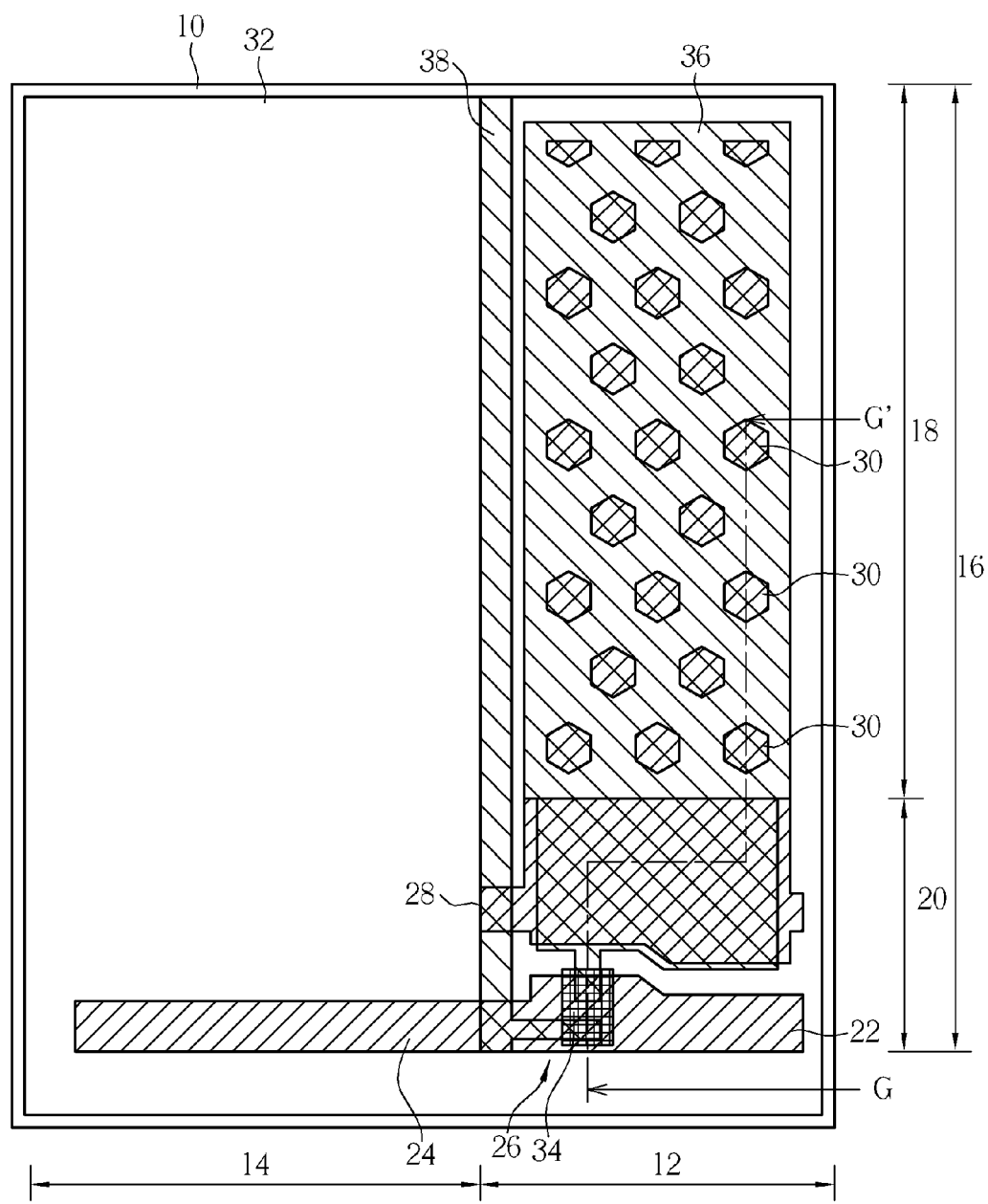
Figure 3B:
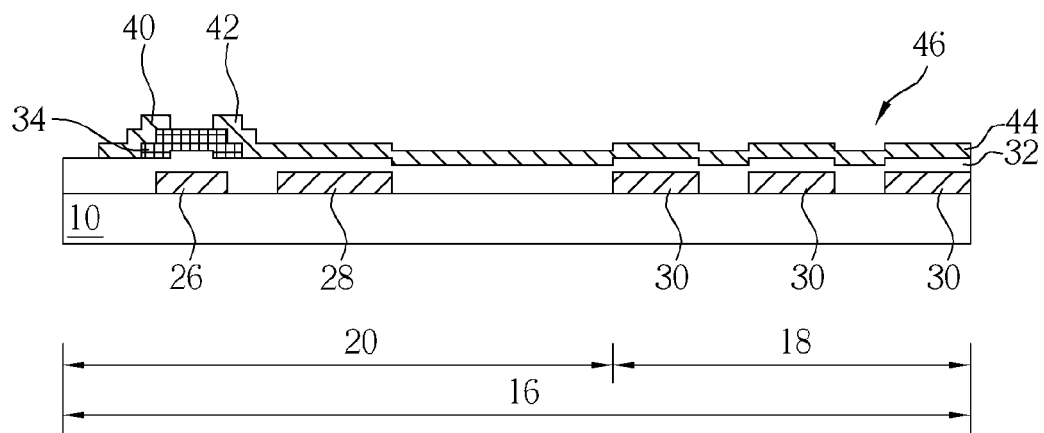

Please refer to FIG. 3A to 3B. FIG. 3A shows a top view of a first preferred embodiment of the present invention. FIG. 3B is a sectional view of FIG. 3A taken along the line G-G'. As shown in FIG. 3A to FIG. 3B. a conductive layer 36 is formed on the substrate 10 to cover the active region 12 and the peripheral circuit region 14. The conductive layer 36 covers the semiconductive layer 34 and the gate insulating layer 32 conformally. Then, a third photo mask (not shown) is utilized during a lithographic and development process, which is followed by an etching process to pattern the conductive layer 36. After the etching process, the conductive layer 36 within the peripheral region 14 is removed, and a source line 38, a source electrode 40, a drain electrode 42 and a reflective electrode 44 are formed. The source line 38, the source electrode 40 and the drain electrode 42 are disposed within the element region 20. The reflective electrode 44 connects to the drain electrode 42 and the reflective electrode 44 extends from the element region 20 to the reflective region 18.

It is noteworthy that the reflective electrode 44 within the reflective region 18 overlaps with each of the protruding bumps 30. The surface of the gate insulating layer 32 below the reflective electrode 44 goes up and down because a step is between each of the protruding bumps 30 and the substrate 10. Therefore, the surface of the reflective electrode 44 in the reflective region 18 forms a corrugated structure 46, or a convex/concave structure. The corrugated structure 46 can thereby reflect an incident light illuminating the corrugated structure in a plurality of reflective angles. This allows the reflected light to be a uniform light source for a back light module. In addition, the reflective electrode 44, the source line 38, the source electrode 40 and the drain electrode 42 are formed by the same photo mask.

Figure 4A:
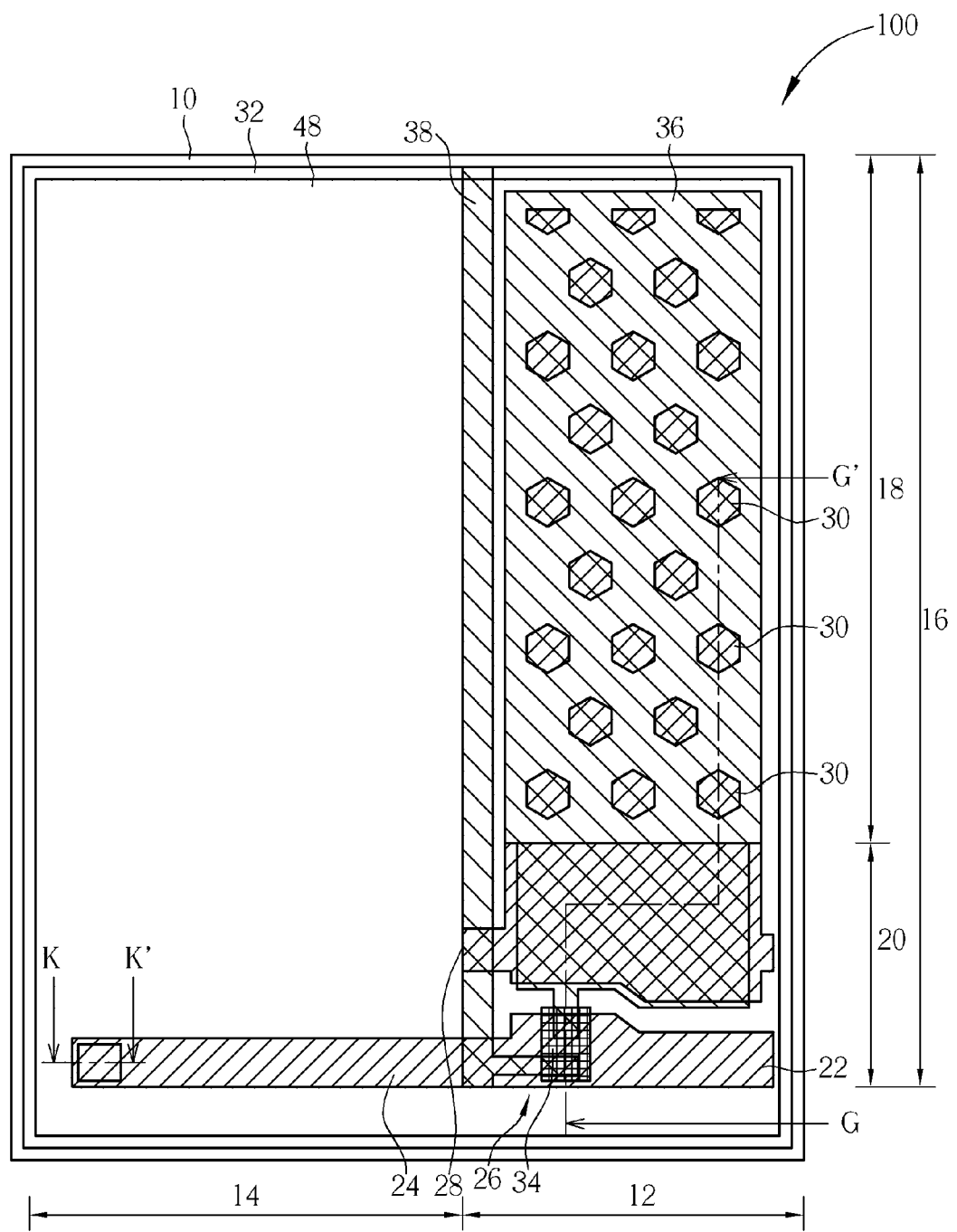

Please refer to FIGS. 4A, 4B and 4C. FIG. 4A shows a top view of a first preferred embodiment of the present invention. FIG. 4B is a sectional view of FIG. 4A taken along the line G-G'. FIG. 4C is a sectional view of FIG. 4A taken along the line K-K'. As shown in FIGS. 4A, 4B and 4C, an insulating layer 48 is formed to cover the pixel region 16 and the peripheral circuit region 14. That is, the insulating layer 48 covers the entire substrate 10. Then, a fourth photo mask (not shown) is utilized during a lithographic and development process, which is followed by an etching process to pattern the insulating layer 48 within the reflective region 18 so as to form numerous openings 52. The reflective layer 44 directly above each protruding bump 30 within the reflective region 18 is exposed through the openings 52. After utilizing the fourth photo mask, the insulating layer 32 and the gate insulating layer 48 are patterned to form an opening 54 exposing part of the gate line 24.

According to a preferred embodiment, the insulating layer 48 may be silicon nitride. Additionally, the insulating layer 48 surrounding the reflective electrode 44 within the reflective region 18 can reflect the light illuminating the insulating layer 48 toward the reflective electrode 44. Next, a conductive layer 56 is formed entirely within the active region 12 and the peripheral region 14. Then, a fifth photo mask (not shown) is utilized during a lithographic and development process, and followed by an etching process to pattern the conductive layer 56 for removing the conductive layer 56 within the active region 12 and removing part of the conductive layer 56 within the peripheral circuit region 14. Only the conductive layer 56 in the opening 54 and around the opening 54 remains. This enables the conductive layer 56 within the peripheral region 14 to connect to the gate line 24 electrically. Moreover, the gate line 24 covered by the conductive layer 56 can be kept from being oxidized. The conductive layer 56 preferably is ITO. At this point, the reflective pixel array substrate is completed.

The present invention also provides a reflective pixel array substrate. Please refer to FIGS. 4A and 4B, FIG. 4A depicts a top view of a reflective pixel array substrate according to a second preferred embodiment of the present invention. FIG. 4B is a sectional view of FIG. 4A taken along the line G-G'. FIG. 4C is a sectional view of FIG. 4A taken along the line K-K'. As shown in FIGS. 4A, 4B and 4C, the reflective pixel array substrate 100 includes a substrate 10 having an active region 12 and at least one peripheral circuit region 14. The peripheral circuit region 14 is disposed on at least one edge of the active region 12. At least one pixel region 16 is disposed in the active region 12. The pixel region 16 is divided into a reflective region 18 and an element region 20. For the sake of brevity, only one pixel region 16 is described in the detailed description. Please note, however, that there could be numerous pixel regions in the active region 12, and each of the pixel regions 16 can be divided into an element region 20 and a reflective region 18. The substrate 10 can be glass, plastic, quartz or other suitable material.

In addition, a thin film transistor 58 is disposed within the element region 20, wherein the thin film transistor 58 includes a gate electrode 26 disposed on the substrate 10. A gate insulating layer 32 covers the gate electrode 26 and extends from the element region 20 to the reflective region 18 and the peripheral circuit region 14. A semiconductive layer 34 is disposed on the gate insulating layer 32 and overlaps with the gate electrode 26. A source electrode 40 and a drain electrode 42 are both disposed on the semiconductive layer 34 and on the gate insulating layer 32. Moreover, a gate line 24 connects to the gate electrode 26 and extends from the element region 20 to the peripheral circuit region 14. The gate insulating layer 32 extends from the element region 20 to the peripheral region 14 and covers the gate line 24. A common line 28 is disposed in the element region 20.

The reflective pixel array substrate 100 further includes numerous protruding bumps 30 disposed within the reflective region 18 of the substrate 10. The gate insulating layer 32 extends from the element region 20 to the reflective region 18 and covers each of the protruding bumps 30. Each of the protruding bumps 30 is floating and is disposed individually. That is, the protruding bumps 30 do not connect with each other. A reflective electrode 44 is disposed on the gate insulating layer 32 and connects to the drain electrode 42. The reflective electrode 44 extends from the element region 20 to the reflective region 18. It is noteworthy that a step is between each protruding bump 30 and the substrate 10 so that the gate insulating layer 32 on the protruding bumps 30 and the substrate 10 goes up and down with the step profile. The reflective electrode 44 covering on the gate insulating layer 32 therefore forms a corrugated structure 46. The light illuminated on the corrugated structure 46 can be reflected into numerous reflective angles so the reflected light can form a uniform light source. Additionally, please refer to FIG. 1A, which shows each of the protruding bumps 30, the gate line 24, the gate electrode 26 and the common line 28 are formed by the same conductive layer 22. Moreover, please refer to FIGS. 4A and 4B, which shows an insulating layer 48 covers the pixel region 16 including the thin film transistor 58 and the reflective electrode 44 therein. The insulating layer 48 also covers the peripheral circuit region 14 including the gate insulating layer 32 therein. The insulating layer 48 within the reflective region 18 has numerous openings 52 that expose the reflective electrode 44 directly above each protruding bump 30. At least one opening 54 is disposed in the gate insulating layer 32 and the insulating layer 48 within the peripheral circuit region 14. Part of the gate line 24 is exposed through the opening 54. A conductive layer 56 fills in the opening 54. The conductive layer 56 also covers the insulating layer 48 within the peripheral circuit region 14 and covers the gate line 24 exposed through the opening 54. The conductive layer 56 could be ITO.

To sum up, the method of fabricating the reflective pixel array substrate is compatible with current fabricating processes. The gate electrode and the protruding bumps of the reflective pixel array substrate are formed by utilizing the same photo mask. The reflective electrode, the source electrode, and the drain electrode are formed by using the same photo mask. Therefore, the fabricating process of the reflective pixel array substrate only needs five photo masks so the process is simplified and the production cost can be reduced.

Those skilled in the art will readily observe that numerous modifications and alterations of the device and method may be made while retaining the teachings of the invention.

What is claimed is:

1. A method of fabricating a reflective pixel array substrate, comprising:
   providing a substrate having at least a pixel region, the pixel region having a reflective region and an element region;
   forming a first conductive layer on the substrate;
   patterning the first conductive layer to form a gate line, a gate electrode and a common line within the element region, and forming a plurality of protruding bumps which are polygonal or oval-shaped within the reflective region;
   forming a first insulating layer covering the substrate, the gate line, the gate electrode, the common line and the protruding bumps;
   forming a semiconductive layer on the gate electrode;
   forming a second conductive layer on the first insulating layer and the semiconductive layer;
   patterning the second conductive layer to form a source line, a source electrode, and a drain electrode within the element region, and to form a reflective electrode extending from the element region to the reflective region, the reflective electrode overlapping with the protruding bumps;
   forming a second insulating layer to cover the element region and the reflective region; and
   patterning the second insulating layer within the reflective region to form a plurality of first openings, wherein the reflective electrode disposed directly above each of the plurality of the protruding bumps is exposed through the first openings and the reflective electrode connects to the drain electrode electrically.

2. The method of fabricating a reflective pixel array substrate of claim 1, wherein the substrate further comprises a peripheral circuit region, and the gate line and the first insulating layer extend from the element region to part of the peripheral circuit region.

3. The method of fabricating a reflective pixel array substrate of claim 1, wherein the shape of each of the protruding bumps comprises polygonal, circular or oval-shaped.

4. The method of fabricating a reflective pixel array substrate of claim 1, wherein the reflective electrode covers the reflective region entirely and the surface of the reflective electrode within the reflective region forms a corrugated structure.

5. The method of fabricating a reflective pixel array substrate of claim 1, wherein the protruding bumps are floating.

6. The method of fabricating a reflective pixel array substrate of claim 1, wherein each of the protruding bumps is separate from each other.

7. The method of fabricating a reflective pixel array substrate of claim 1, wherein the protruding bumps are hexagonal.

8. The method of fabricating a reflective pixel array substrate of claim 2, wherein when the second insulating layer is patterned, the first insulating layer within the peripheral circuit region is patterned simultaneously to form a second opening and part of the gate line within the peripheral circuit region is exposed through the second opening.

9. The method of fabricating a reflective pixel array substrate of claim 8, further comprising:
   after patterning the second insulating layer, forming a patterned third conductive layer covering the second insulating layer and the gate line within the peripheral circuit region.

10. The method of fabricating a reflective pixel array substrate of claim 4, wherein a light illuminates the corrugated structure, and is reflected in a plurality of reflective angles.

* * * * *